(12) United States Patent
Rønnekleiv (10) Patent No.: US 6,856,401 B1
(45) Date of Patent: Feb. 15, 2005

(54) ELIMINATION OF POLARIZATION FADING IN UNBALANCED OPTICAL MEASURING INTERFEROMETERS

(75) Inventor: Erlend Rønnekleiv, Trondheim (NO)

(73) Assignee: Optoplan AS, Trondheim (NO)

( * ) Notice: Subject to any disclaimer, the term of this patent is extended or adjusted under 35 U.S.C. 154(b) by 374 days.

(21) Appl. No.: 10/018,460

(22) PCT Filed: Jun. 22, 2000

(86) PCT No.: PCT/NO00/00219
§ 371 (c)(1),
(2), (4) Date: Dec. 19, 2001

(87) PCT Pub. No.: WO00/79335
PCT Pub. Date: Dec. 28, 2000

(30) Foreign Application Priority Data

Jun. 23, 1999 (NO) .............................................. 993135

(51) Int. Cl.[7] .............................................. G01B 9/02

(52) U.S. Cl. ........................ 356/477; 356/478; 356/480

(58) Field of Search ................................ 356/477, 478, 356/480; 250/227.19, 227.27; 385/12; 367/149, 153

(56) References Cited

U.S. PATENT DOCUMENTS

| | | | |
|---|---|---|---|
| 4,897,543 A | | 1/1990 | Kersey |
| 4,932,783 A | * | 6/1990 | Kersey et al. ............... 356/477 |
| 5,104,222 A | * | 4/1992 | Kersey et al. ............... 356/477 |
| 5,173,743 A | | 12/1992 | Kim |
| 5,351,124 A | | 9/1994 | Laskoskie et al. |

OTHER PUBLICATIONS

N. J. Frigo, et al., "Technique for Elimination of Polarisation Fading In Fibre Interferometers", Electronics Letters, Apr. 12, 1984, vol. 20, No. 8, pp. 319–320.

A. D. Kersey, et al., "Polarisation–Insensitive Fibre Optic Michelson Interferometer," Electronics Letters, Mar. 14, 1991, vol. 27, No. 6, pp. 518–520.

A.D. Kersey, et al., "Optimization And Stabilization of Visibility In Interferometric Fiber–Optic Sensors Using Input–Polarization Control," Journal of Lightwave Technology, vol. 6, No. 10, Oct. 1988, pp. 1599–1609.

K. H. Wanser and N. H. Safar, "Remote Polarization–Control For Fiber–Optic Interferometers," Optics Letters, Mar. 1987, vol. 12, No. 3, pp. 217–219.

A. D. Kersey and M. J. Marrone,"Input–Polarisation Scanning Technique For Overcoming Polarisation–Induced Signal Fading In Interferometric Fibre Sensors," Electronics Letters, Jul. 21, 1988, vol. 24, No. 15, pp. 931–933.

(List continued on next page.)

Primary Examiner—Samuel A. Turner
(74) Attorney, Agent, or Firm—Moser, Patterson & Sheridan (57) ABSTRACT

Method and assembly for sustained elimination or reduction of polarization induced signal fading in optical interferometer networks comprising at least two optical paths from an input port to an output port, the transmission delays of the paths differing by $\tau$, an interrogation arrangement interrogating the optical phase differences between the paths, containing at least one optical source launching optical power into a port, a detector arrangement converting the optical power from an output port into electrical detector signals, and a control and signal processing unit capable of processing detector signals to determine the phase difference. The method comprising the steps of: altering the input polarization state produced by the source with a modulation frequency that is comparable to or higher than $1/(4\tau)$ receiving the optical signals at the detector arrangement providing a detector signal; processing the detector signal determining the phase difference between the optical signals.

13 Claims, 4 Drawing Sheets

OTHER PUBLICATIONS

A. D. Kersey, et al., "Elimination of Polarization Induced Signal Fading In Interferometric Fiber Sensors Using Input Polarization Control," Optical Fiber Sensors 1988, Technical Digest Series, vol. 2, Conference Edition, pp. I/44–47, Washington, USA, 1988.

Xiaodong Zhou, et al., "Polarization Fading Elimination In Interferometric Fiber–Optic Arrays By Input Polarization Control," Proceedings of SPIE, International Society For Optical Engineering Conference, vol. 3478, SPIE–Int. Soc. Eng., Washington, U.S.A., 1998 (Abstract).

* cited by examiner

ELIMINATION OF POLARIZATION FADING IN UNBALANCED OPTICAL MEASURING INTERFEROMETERS

This invention is related to a method and an assembly for the elimination of polarization fading in unbalanced optical measuring interferometers.

BACKGROUND OF THE INVENTION

An optical interferometer is an optical transmission network that produces interference between different portions of optical radiation that have traveled different paths through the network. In an unbalanced optical interferometer the time delay in the two optical paths are different by an amount τ. The output intensity from such an interferometer will have a periodic dependence called fringes of the output intensity that is periodic versus the interferometer phase delay $\phi=2\pi\nu\tau$, where ν is the optical frequency launched into the interferometer. Information about the path delay difference, the input optical frequency, or the input optical frequency spectrum may thus be deduced from the output interference signal.

An optical interferometer network may also contain more than one pair (or set) of paths from the input to the output port. Different pairs (or sets) of paths may then be interpreted as different interferometers. The interference caused by individual interferometers may be interrogated separately, a. by assigning a specific range of optical wavelengths, thus employing a wavelength division multiplexing (WDM) technique,
b. by assigning a specific range of total transmission time delay to the paths associated with each interferometer, thus employing a time division multiplexing (TDM) technique,
c. or by assigning a specific combination of input and output ports to the paths associated with each interferometer, thus employing a space division multiplexing (SDM) technique. An SDM system may for instance be interrogated by using optical switches to access different combinations of input and output ports sequentially, or by splitting the optical radiation from a single interrogation source into different interferometer sub-networks, and connecting one detector to the output of each sub-network.

Network interrogation employing combinations of WDM, TDM and $DM is also possible.

The visibility or amplitude of the output fringes depends on the states of polarization (SOPs) of the two interfering signals, which we will label SOP1 and SOP2. In many interferometers SOP1 and SOP2 will vary randomly with time due to changes in the input SOP or in the birefringence properties of the two optical pathways. The fringe visibility is proportional to the projection of SOP1 onto SOP2. The reduction of fringe visibility with reduced projection of the SOPS is called polarization fading, and generally causes a reduced signal to noise ratio in the interferometer readout. Especially, the situation with SOP1⊥SOP2 (orthogonal SOPs) causing total polarization fading with zero visibility should be avoided. When the fading is total, the interferometer output will not carry any information about ν or τ at all.

Several methods for reduction or elimination of the polarization fading problem are known. One known method uses Faraday rotating mirrors, as disclosed by A. D. Kersey et. al. in ["Polarisation insensitive fibre optic Michelson interferometer", El. Lett., Vol. 27, pp. 518–19, 1991]. This method allows for a simple source and detection system, but it works only for the Michelson interferometer configuration. Furthermore, the Faraday rotating mirrors may be expensive, space consuming, and sensitive to extreme thermal, electromagnetic and other environmental conditions.

Other known methods are based on active polarization control at the input, as disclosed by A. D. Kersey et. al. in ["Optimization and Stabilization of Visibility in Interferometric Fiber-Optic Sensors Using Input-Polarization Control", J. of Lightwave Technol., Vol. 6, pp. 1599–1609, 1998], or the use of a polarizer combined with active polarization control at the output end, as disclosed by K. H. Wanser et. al. in ["Remote polarization control for fiber-optic interferometers", Opt. Lett., Vol. 12, pp. 217–19 1987]. In both cases the polarization controller is continuously adjusted to optimize the fringe visibility. These techniques require relatively complex systems to provide feedback signals to the polarization controller, and in systems with spatial division multiplexing (SDM) or wavelength division multiplexing (WDM) of multiple sensors, individual polarization controllers for each sensor are generally required. The polarization modulator used for the polarization control must be capable of modulating the SOP in three dimensions on the Poincare sphere. This generally implies that the polarization modulators at least must be of the "dual stage" type. Dual stage polarization modulators generally incorporate two independently adjustable birefringent elements, and are thus more complex and expensive than single stage modulators having only one adjustable birefringent element.

Still other known methods are based on modulating the input SOP between three states, as disclosed by A. D. Kersey et. al. in ["Input polarisation scanning technique for overcoming polarisation-induced signal fading in interferometric fiber sensors", El. Lett., Vol. 24, pp. 931–33, 1988] and in [U.S. Pat. No. 4,932,783], or on the use of three detectors at the output with three polarizers that are adjusted to monitor different polarization states, as disclosed by N. J. Prigo et. al. in ["Technique for elimination of polarisation fading in fibre interferometers", El. Lett., Vol. 20, pp. 319–20, 1984]. These techniques increase the complexity of the processing by requiring simultaneous processing of three fringe signals, especially in WDM systems where separate receivers are required for each WDM channel. They also increase the complexity of the hardware by either requiring a dual stage polarization modulator, or three detectors and polarizers.

Another known method is based on the use of a pulsed source and a compensating interferometer which incorporates a polarization maintaining coupler, a standard coupler, and a polarization modulator, as disclosed by B. Y. Kim et. al. in [U.S. Pat. No. 5,173,743]. This method may be attractive when applied to time division multiplexed (TDM) ladder sensor networks. However, the compensating interferometer increases the complexity of the interrogation, and 3 dB of source power is lost in the output coupler from the compensating interferometer. If the network is not of the ladder type, another 3 dB of optical power will be effectively lost at the detector, since only one half of the detected pulses will carry useful information. Another problem with this method is that the readout phase from the interferometer is sensitive to birefringence changes in the lead fiber between the source and the interferometers.

One sensor configuration of special interest is that of a WDM fiber-optic interferometric sensor system employing two identical wavelength selective low reflectivity fiber Bragg grating reflectors to define the two paths of each sensor interferometer. For instance, a Fabry-Perot interferometer can be formed by writing two identical Bragg gratings into the core of a single optical fiber at different locations. Different reflection bands should be dedicated to each sensor, so that information about the individual sensors can be accessed by use of a multi-wavelength source at the network input producing coherent light at each sensor wavelength, and a wavelength division multiplexer at the network output, that directs the interference signal from each sensor to a dedicated detector.

OBJECTIVE

The main objective of the present invention is to provide a simple and practical method and assembly, with reduced complexity compared to existing techniques, which eliminates or reduces the probability for polarization induced fading in optical interferometers. This objective implies that the output signals from the interferometer always should carry the information required to determine the difference in optical path length, or optical phase, between two different paths through the interferometer.

A second objective of the present invention is to provide a method and assembly which allows the readout interferometer phase to be insensitive to birefringence ch es in the lead fiber between the source and the interferometer.

A third objective of the present invention is to provide a method and assembly which can be applied to interrogation of any types of unbalanced interferometer that do not contain polarization selective components, such as polarizers or polarization beam splitters. This class of interferometers includes variants of the Fabry-Perot, Michelson, and Mach-Zender topologies. The method should also be applicable in interrogation systems where a pulsed source and a compensating interferometer is used to compensate out the imbalance of the interrogated interferometer(s).

A fourth objective of the present invention is to provide a method and assembly which can be applied to interrogation of wavelength division multiplexed (WDM), space division multiplexed (SDM), and time division multiplexed (TDM) interferometer networks, including TDM ladder networks.

A specific objective of the present invention is to provide a method and assembly which can be applied to interrogation of fiber optic wavelength division multiplexed sensor systems employing wavelength selective Bragg reflectors in the sensing interferometers and a multi-wavelength source, which requires only one polarization modulator for the entire system, and only one detector dedicated to the monitoring of each sensor.

A general objective of the present invention is to provide a method and assembly that overcomes limitations set by other known methods.

SUMMARY OF THE INVENTION

The main part of the invention is characterized in that the polarization state of the optical power launched into an interferometer network is modulated at a frequency comparable to or higher than the inverse of the difference in transmission time delay between the two optical paths through the interferometer. A control and signal processing unit extracts several interference signals detected at the output of the interferometer network in at least two time slots, that are positioned in time at certain time delays (or phases) relative to the input polarization modulation period. The time slots should be chosen such that the two optical signals interfering at the output port after having traveled the two paths through the interferometer, originate from different combinations of input polarization states in each time slot, and such that total polarization fading of the interference visibility never will occur simultaneously in all time slots. Minimization of the sensitivity of the readout interferometer phase to birefringence changes in the path from the interrogating optical source to the interferometer may be achieved by modulating the input polarization between two orthogonal polarization states and by processing signals from four distinct time slots.

DETAILED DESCRIPTION OF THE INVENTION

The invention will be described below with reference to the accompanying drawings illustrating the invention by way of examples.

Figure 1:
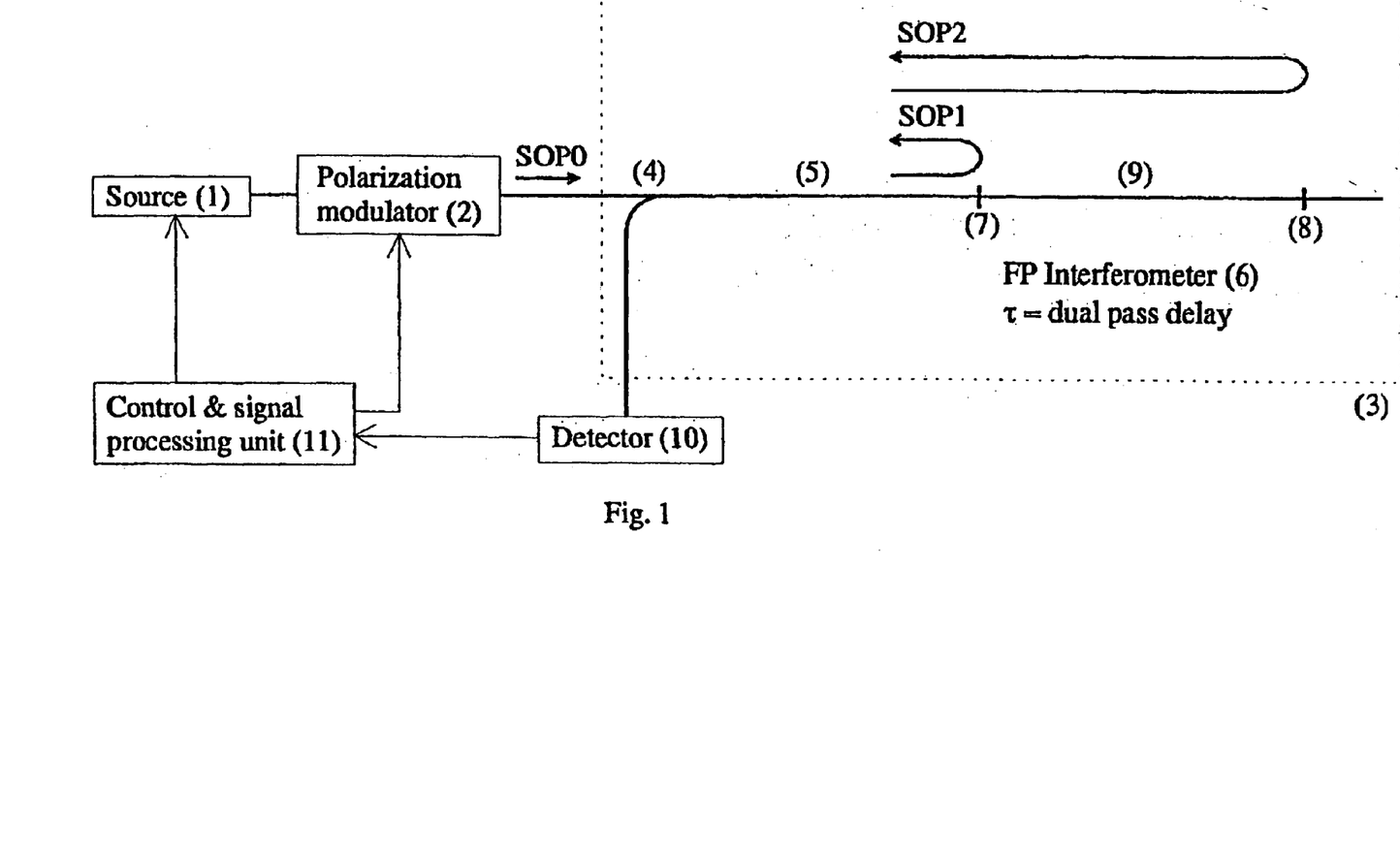
FIG. 1 illustrates a preferred embodiment of this invention, including the interrogated interferometer network (3) including a Fabry-Perot interferometer.

In the preferred embodiment of this invention, illustrated in FIG. 1, an optical source (1) launches coherent optical radiation into the fiber-optic sensor network (3) through a polarization modulator (2). The sensor network (3) consists of an input-output optical coupler (4) with a 50% power splitting ratio, a lead fiber (5) and a low finesse Fabry-Perot (Pp) interferometer (6) consisting of two reflectors (7,8) and a fiber delay line (9) with dual-pass delay $\tau$. The power reflectivities of (7) and (8) should preferably be small (<10%), allowing multiple mirror reflections to be neglected. The output power from the network (3) is guided to a photo-detector, and the resulting analog electrical signal is transferred to the analog-to-digital conversion interface of a control & signal processing unit (11), which is responsible for processing the detected signals electronically to extract the interferometer phase information, and for transferring this information in a suitable form to the end user.

Figure 2:
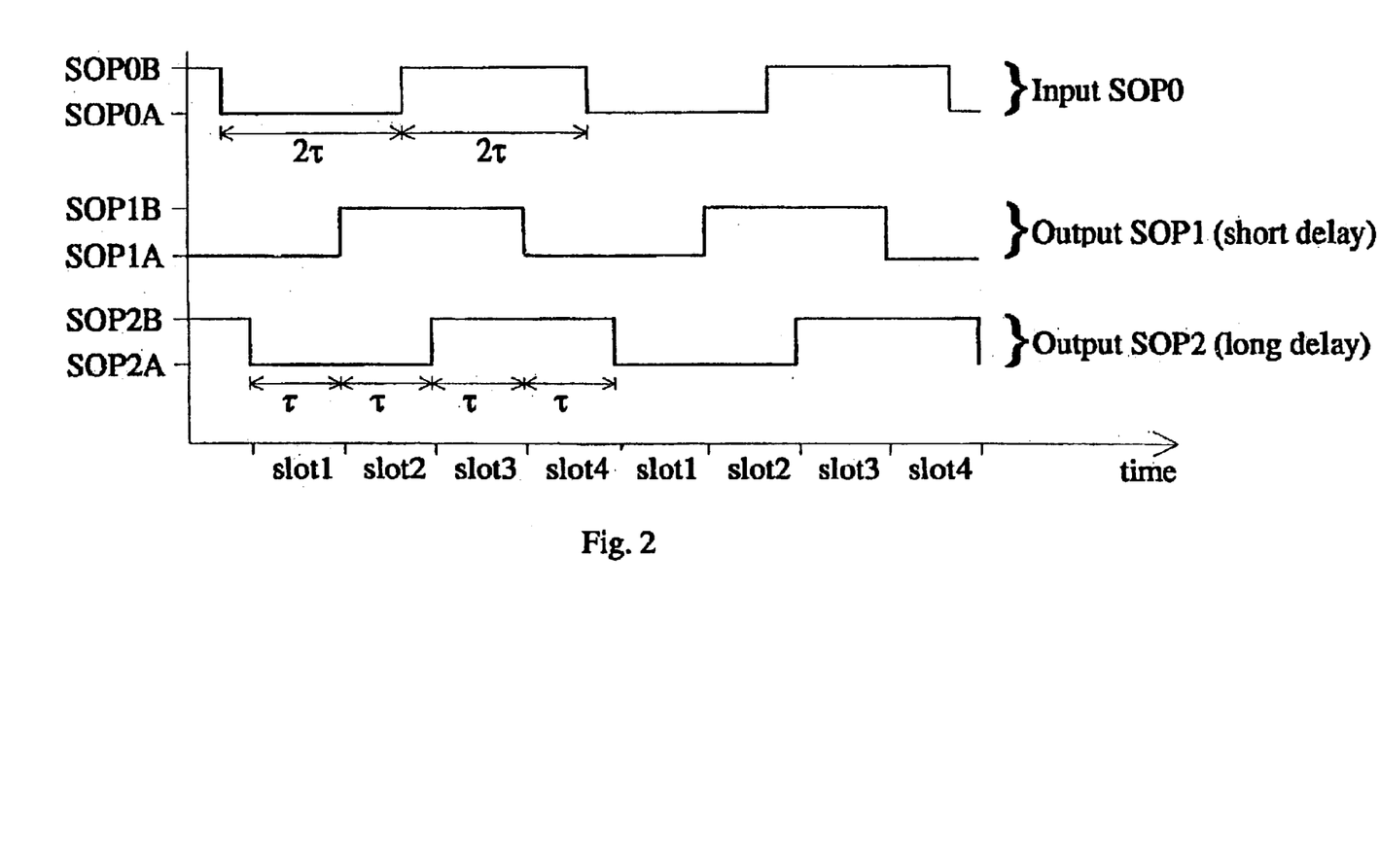
FIG. 2 illustrates a typical evolution of the input and output states of polarizations (SOPs) versus time.

The control & signal processing unit (11) also controls the polarization modulator (2) and causes the input polarization state SOP0 launched into (3) to switch between two orthogonal states, denoted SOP0$a$ and SOP0$b$ in FIG. 2. The polarization switching period should equal $4\tau$, and the duty-cycle of the modulation should be 50%, as illustrated by the top curve in FIG. 2. The coupler (4), the lead fiber (5), the interferometer fiber (9), and the reflectors (7,8) should have negligible polarization dependent losses. The latter condition implies that the polarization states SOP1 and SOP2 reflected from (7) and (8), respectively, and interfering at the left hand side of (7) in FIG. 1, will also both be switching between two orthogonal states, denoted SOP1A, SOP1B. SOP2A, and SOP2B in FIG. 2. SOP1A and SOP1B may then generally be written in a Jones-vector notation as $$SP01A = \overline{A} = K_1 \begin{bmatrix} \cos(\alpha) \\ \sin(\alpha)e^{iy} \end{bmatrix} \quad SP01B = \overline{B} = K_1 \begin{bmatrix} -\sin(\alpha)e^{-ir} \\ \cos(\alpha) \end{bmatrix}$$

where the vector elements are chosen to represent the projections of the fields onto the orthogonal elgenpolarization states of the interferometer. By the interferometer eigen-polarization states we mean the orthogonal output SOPs generated when the SOP0 is adjusted so that SOP1= SOP2. $K_1$ depends on the source power, and the losses in the transmission through (4,5,9) and in the reflections (7,8), while a and 7 are angles that depend on the birefringence properties of the lead fiber (5).

The chosen polarization projection states allow SOP2A and SOP2B to be written on the form $$SP02A = J\bar{A} = K_2 e^{i\phi} \begin{bmatrix} \cos(\alpha) \\ \sin(\alpha)e^{i(\gamma+\phi)} \end{bmatrix}$$

$$SP02B = J\bar{B} = K_2 e^{i\phi} \begin{bmatrix} -\sin(\alpha)e^{-i\gamma} \\ \cos(\alpha)e^{i\theta} \end{bmatrix}$$

where the Jones matrix $$J = e^{i\phi} \begin{bmatrix} 1 & 0 \\ 0 & e^{i\theta} \end{bmatrix} \quad (1)$$

essentially describes difference between the SOP changes from SOP0 to SOP1 and that from SOP0 to SOP1. $\phi = 2\pi\nu\tau$ is the interferometer phase that we want to measure, $\nu$ is the optical frequency, and $\theta$ is the birefringent phase-shift between the eigen-polarization states of the interferometer. $K_2$ depends on losses in the transmissions and reflections of the system.

The two lower curves in FIG. 2 illustrate the switching of SOP1 and SOP2. A periodic pattern consisting of 4 time slots can be observed, where:

SOP1A interferes with SOP2A in slot 1,
SOP1B interferes with SOP2A in slot 2,
SOP1B interferes with SOP2B in slot 3,
SOP1A interferes with SOP2B in slot 4.

The interference power will be composed by one term that depends on $\phi$, $\theta$, $\gamma$, and $\beta$, and one term that is independent on these parameters. The power from each time slot n will produce an electrical signal $S_n$ at the detector output, which is proportional to the interference power Based on the given conditions, it can be shown that $$S_1 = K_3 Re\{\bar{A}^+ J\bar{A}\} = a\, cos(\phi_1)$$

$$S_2 = K_3 Re\{\bar{B}^+ J\bar{A}\} = b\, cos(\phi_2)$$

$$S_3 = K_3 Re\{\bar{B}^+ J\bar{B}\} = a\, cos(\phi_3)$$

$$S_4 = K_3 Re\{\bar{A}^+ J\bar{B}\} = b\, cos(\phi_4)$$

where $K_3$ accounts for the detector responsively and losses in (4,5), superscript $^+$ indicates conjugate transpose, $\phi_1 = \phi + \theta + \phi$ $\phi_2 = \phi + \theta/2 + \gamma + \pi/2$ $\phi_3 = \phi - \phi$, and $a^2 + b^2 = (K_1 K_2 K_3)^2$.

$\phi_4 = \phi/2 + \gamma + \pi/2 \quad (3)$ $\phi$ is a function of $\theta$ and $\alpha$.

The control & processing unit extracts the signals S, through $S_4$ and processes them to determine the phases $\phi_1$ through $\phi_4$. Note that the detected signals are delayed relative to the control signals supplied to the polarization modulator. Some calibration of the input slot timing is therefore required. Several methods are known for phase reconstruction without ambiguity from interference signals, as disclosed for instance by I. J Bush in ["High performance interferometric demodulation techniques", SPIE Proc., Vol. 1795, pp. 412–20, 1992]. Generally, these methods require means for modulating the interference phase to generate in-phase and quadrature information from the interference fringes. In the preferred embodiment of the present invention this can be achieved by modulating the phase of the source radiation at a frequency that is an odd harmonic of $1/(4\tau)$ We see from (Eq. 2) that the detected fringe amplitudes equal a in slots. 1 and 3, and b in slots 2 and 4. Since at $a^2 + b^2 = (K_1 K_2 K_3)^2$ according to (Eq. 3), there can never be fading simultaneously in two neighboring time slots, and the sum of the signal to noise ratios of two neighboring time slots, limited by the fringe amplitude, will be independent on the birefringence parameters $\theta$, $\gamma$, and $\alpha$. Thus, the main objective of the present invention is satisfied.

It remains to combine the information carried by $\phi_1$, $\phi_2$, $\phi_3$, and $\phi_4$ into one single estimate for the interferometer phase delay, which according to (Eq. 1) is $\phi$ for one eigen-polarization and $\phi+\theta$ for the other eigen-polarization, in the preferred embodiment, the estimator $$\phi = \frac{a^2(\phi_1 + \phi_2) + b^2(\phi_2 + \phi_4\pi)}{2(a^2 + b^2)}$$

is computed by the control & processing unit to estimate the interferometer phase delay. By combining (Eq. 3) and (Eq. 4) we see that $\phi$ in the absence of noise equals $\phi+\theta/2$, which is exactly the mean of the two eigen-polarization phase delays, is independent on the birefringence parameters $\gamma$ and a $\alpha$ of the lead fiber, and thus the second objective of the present invention is satisfied. The weighting in (Eq. 4) of $\phi_1+\phi_3$ and $\phi_2+\phi_4+\pi$ by $a^2$ and $b^2$, respectively, ensures that the signal to noise ratio of the estimator always will be dose to a maximum.

Figure 3:
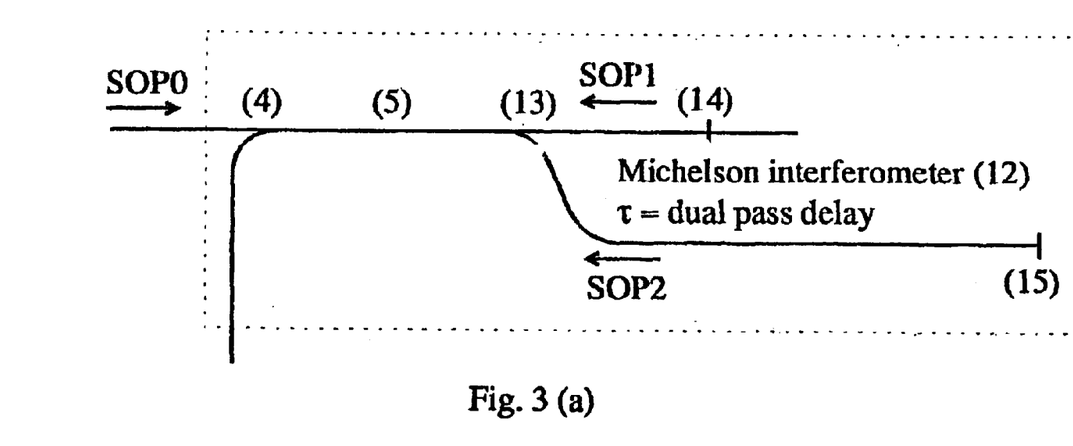
FIG. 3 illustrates alternative embodiments of the interferometer network (3) in FIG. 1, incorporating a Michelson interferometer in FIG. 3 ($a$) and a Mach-Zender interferometer in FIG. 3 ($b$).

The present invention may be implemented for interrogation of any types of unbalanced interferometer networks that do not contain polarization selective components such as polarizers or polarization beam splitters. As one example, FIG. 3(a) illustrates a network incorporating a Michelson interferometer, which may replace the network (3) in FIG. 1 in a second embodiment of the present invention. SOP0 is launched into the input/output coupler (4) and the lead fiber (5), having the same functions as in FIG. (1). The Michelson interferometer (12) is formed by an optical coupler (13) splitting the optical power from (5) into two delay arms, with reflectors (14,15) positioned at different distances from (13) so that the dual, path time delays experienced by the two reflected signals recombined in (13) differ by $\tau$. SOP1 and SOP2 in this case refer to the polarization states recombined in (13) after returning from the short delay arm with reflector (14) and the long delay arm with reflector (15), respectively.

As another example, FIG. 3(b) illustrates a network incorporating a Mach-Zender (MZ) interferometer, which may replace the network (3) in FIG. 1 in a third embodiment of the present invention. This system has separate input (16) and output (22) lead fibers. SOP0 is launched into (16). The MZ interferometer (17) is formed by an optical coupler (18) splitting the optical power from (16) into two delay arms (19,20). The signals emerging from (19) and (20) are combined in a second optical coupler (21). The single pass time delays between (18) and (21) through (19) and (20) should differ by $\tau$. SOP1 and SOP2 in this case refer to the polarization states entering (21) from the short (19) and long (20) arms, respectively.

Figure 4:
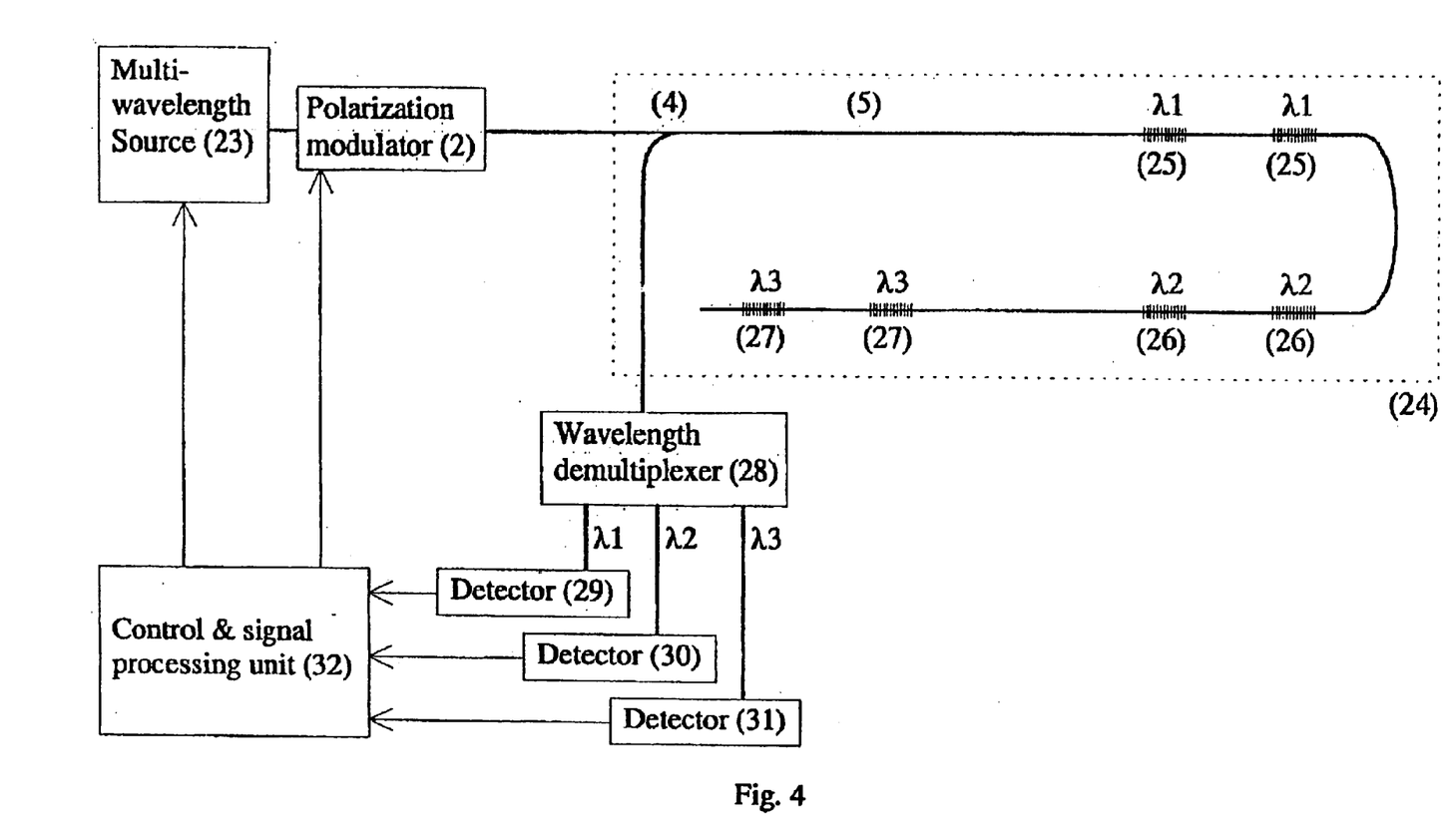
FIG. 4 illustrates an alternative embodiment of the invention, demonstrating interrogation of multiple wavelength division multiplexed interferometers.

FIG. 4 illustrates a fourth embodiment of the present invention capable of wavelength division multiplexing of several wavelength selective interferometers. In the illustrated example, a multi-wavelength source (23) is used, launching coherent radiation at three sensor interrogation wavelengths $\lambda_1$, $\lambda_2$, and $\lambda_3$ through the polarization modulator (2) into the interferometer network (24). The input polarization of all wavelengths is switched simultaneously between orthogonal states, in the same way as explained for SOP0 in the preferred fifth embodiment of the present invention. The network contains an input/output coupler (4), a lead fiber (5) and three FP-interferometers with approximately equal dual-pass delay $\tau$. Each FP-interferometer consists of two identical Bragg gratings, denoted (25), (26) or (27), causing a weak reflection in a narrow band around the respective sensor interrogation wavelength $\lambda_1$, $\lambda_2$, or $\lambda_3$. Each sensor grating pair should produce negligible reflections at the interrogation wavelengths of the other sensors. A wavelength division demultiplexer (28) is connected to the output branch of (4), distributing the interference signals from the different interferometers to different detectors (29, 30, 31). The control & processing unit (32) processes the three detector signal sequences in parallel in the same way as explained for the single processing channel in the first preferred embodiment, to extract the individual interference phases of the three interferometers and present this information for the end user.

The network (24) in FIG. 4 can be interrogated by a time division multiplexing (TDM) approach using the present invention, provided that all reflectors reflect the same wavelength, i.e. either $\lambda_1=\lambda_2=\lambda_3$, or the gratings must be replaced with broad-banded reflectors, and that the dual pass delays from the input/output (4) to the beginning of the different interferometers all are separated by at least in the order of 3$\tau$. In this case, a possible fifth embodiment of the present invention uses a pulsed single wavelength source at wavelength $\lambda_1$, and only one detector without any wavelength demultiplexer in front, like the detector (10) in FIG. 1. The source and polarization modulator produces pulses with a duration of minimum 2$\tau$, with polarization state switching between orthogonal polarizations within each pulse at a frequency that is an odd harmonic (or multiple) of $1/(4\tau)$ and which is higher than the inverse pulse duration, like illustrated for SOP0 in FIG. 2. The detected signal will consist of one time sequence for each pulse transmitted from the source, each sequence containing at least four time-slots originating from each sensor interferometer. The time slots contain information about the interference phases of individual sensors, encoded in the same way as for the output time-slot signals described in the first preferred embodiment. The control and processing unit may thus extract the interference phases by separating, identifying and processing the information originating from each sensor in the same way as described for the first preferred embodiment.

A special case of TDM interferometer networks are ladder interferometer networks, with geometries of the type described in [U.S. Pat. No. 5,173,743, FIG. 1, items (26), (27 a, b, c, d), (28), and (31 a, b, c, d)]. In the ladder networks, the input to output delay of a number N of interferometer arms are equally spaced by the amount $\tau$, and all paths, except for two, are thus part of two interferometers at the same time. The current invention can be used for interrogation of such ladder networks, including a compensating interferometer with imbalance $\tau$ placed after the source, as illustrated in [U.S. Pat. No. 5,173,743, FIG. 1, items (20, 21, 22, 23, 25)]. Each pulse from the source should have duration equal to $\tau$, and will thus be split into two by the compensating interferometer. The polarization modulator can be placed between the compensating interferometer and the network. Polarization maintaining fibers and couplers should be used in the compensating interferometer to ensure that the polarization states of the two consecutive pulses emerging from the compensating interferometer will be switching between identical pairs of orthogonal polarization states. Alternatively, an imbalanced Michelson interferometer with Faraday-rotating mirrors, and otherwise standard fibers and couplers, may be used as the compensating interferometer.

The current invention may be used for interrogation of such ladder networks, without the inclusion of any compensating interferometer. The duration of each pulse from the source should in this case be close to 2$\tau$.

Although coherent sources have been assumed in all the previous examples, the present invention can also be used in a white-light interferometer that are interrogated by scanning the path-imbalance of a compensating interferometer.

What is claimed is:

1. A method of reducing polarization induced signal fading in an optical interferometer network, comprising:

providing a first and a second optical path from an input port to an output port, wherein transmission delays of the first and second optical paths differ by an amount of time $\tau$, inputting an input signal into the input port;

altering a polarization state of the input signal to switch between a first state of polarization (SOP0A) during a first portion of a polarization switching period and a second state of polarization (SOP0B) during a second portion of the polarization switching period, wherein the polarization state is altered with a modulation frequency that is a multiple of $1/(4\tau)$;

receiving an interference signal from the output port, the interference signal caused by interference between a first output signal having passed through the first optical path and a second output signal having passed through the second optical path; and processing the interference signal to determine a phase difference between the first and second output signals.

2. The method of claim 1, further comprising extracting and processing four interference signals (i,ii,iii,iv) to produce estimates for interference phases of the four interference signals, wherein the four interference signals are separated in time and represent interference between polarization states at the output port that originate from the transmission of:

(I) SOP0A through both the first and the second optical path, (ii) SOP0B through the first optical path and SOP0A through the second optical path, (iii) SOP0B through both the first and the second optical paths, and (iv) SOP0A through the first optical path and SOP0B through the second optical path.

3. The method of claim 2, wherein the interference visibilities or fringe amplitudes of the four interference signals (i,ii,iii,iv) are calculated.

4. The method of claim 3, wherein SOP0A and SOP0B are orthogonal polarization states, a first improved phase estimate ($\phi_1$) is calculated as the average of interference phase estimates produced from the interference signal (i) and the interference signal (iii), a second improved phase estimate ($\phi_2$) is calculated as the average of the two interference phase estimates produced from the interference signal (ii)

and the interference signal (iv), and a combined phase estimate is calculated as a weighted average of $\phi_1$ and $\phi_2$, the ratio between the weighting of $\phi_1$ and the weighting of $\phi_2$ is decided from the relation between the interference visibilities or fringe amplitudes.

5. The method of claim 1, wherein the optical interferometer network is a wavelength division multiplexed interferometer network having the first and second optical paths.

6. The method of claim 1, wherein the optical interferometer network is a time division multiplexed interferometer network having the first and second optical paths.

7. The method of claim 1, wherein the optical interferometer network is space division multiplexed interferometer networks having the first and second optical paths.

8. An assembly for reducing polarization induced signal fading in an optical interferometer network, comprising:

a first and a second optical path from an input port to an output port, wherein transmission delays of the first and second optical paths differ by an amount of time $\tau$, an optical source for launching optical power into the input port, the optical source having a polarization modulator that switches a polarization state between a first state of polarization (SOP0A) during a first portion of a polarization switching period and a second state of polarization (SOP0B) during a second portion of the polarization switching period, wherein the polarization state is altered with a modulation frequency that is a multiple of $1/(4\tau)$;

a detector for converting the optical power received from the output port into electrical detector signals; and a control and signal processing unit for processing the detector signals to determine a phase difference induced between optical waves having traveled the first and second paths.

9. The assembly of claim 8, wherein the control and signal processing unit is configured to extract and further process four interference signals (i,ii,iii,iv) to produce estimates for at least one member of the group consisting of interference phases of the four interference signals, visibilities of the four interference signals and fringe amplitudes of the four interference signals, the four interference signals separated in time and represented by interference between polarization states at the output port originating from the transmission of:

(i) SOP0A through both the first and the second optical path, (ii) SOP0B through the first optical path and SOP0A through the second optical path, (iii) SOP0B through both the first and the second optical paths, and (iv) SOP0A through the first optical path and SOP0B through the second optical path.

10. The assembly of claim 9, wherein SOP0A and SOP0B are orthogonal polarization states, a first improved phase estimate ($\phi_1$) is calculated as the average of interference phase estimates produced from the interference signal (i) and the interference signal (iii), a second improved phase estimate ($\phi_2$) is calculated as the average of the two interference phase estimates produced from the interference signal (ii) and the interference signal (iv), and a combined phase estimate is calculated as a weighted average of $\phi_1$ and $\phi_2$, the ratio between the weighting of $\phi_2$ and the weighting of $\phi_2$ is decided from the relation between the interference visibilities or fringe amplitudes.

11. The assembly of claim 8, wherein the first and second optical paths are within a fiber optic Michelson interferometer.

12. The assembly of claim 8, the first and second optical paths are within a fiber optic Fabry-Perot interferometer.

13. The assembly of claim 8, the first and second optical paths are within a fiber optic Mach-Zender interferometer.

* * * * *